(12) United States Patent
Li et al.

(10) Patent No.: US 11,974,332 B2
(45) Date of Patent: Apr. 30, 2024

(54) METHOD AND APPARATUS FOR RANDOM ACCESS PROCEDURE

(71) Applicant: ZTE Corporation, Guangdong (CN)

(72) Inventors: Ziyang Li, Guangdong (CN); Li Tian, Guangdong (CN); Wei Cao, Guangdong (CN); Jianqiang Dai, Guangdong (CN); Yuzhou Hu, Guangdong (CN); Junfeng Zhang, Guangdong (CN)

(73) Assignee: ZTE Corporation, Guangdong (CN)

( * ) Notice: Subject to any disclaimer, the term of this patent is extended or adjusted under 35 U.S.C. 154(b) by 24 days.

(21) Appl. No.: 17/571,061

(22) Filed: Jan. 7, 2022

(65) Prior Publication Data

US 2022/0132598 A1 Apr. 28, 2022

Related U.S. Application Data

(63) Continuation of application No. PCT/CN2019/095214, filed on Jul. 9, 2019.

(51) Int. Cl.
*H04W 74/08* (2009.01)
*H04L 5/00* (2006.01)
*H04W 74/0833* (2024.01)

(52) U.S. Cl.
CPC ....... *H04W 74/0841* (2013.01); *H04L 5/0051* (2013.01)

(58) Field of Classification Search
CPC .......... H04W 74/0841; H04W 74/0833; H04L 5/0051

USPC ................................................. 370/329–330
See application file for complete search history.

(56) References Cited

U.S. PATENT DOCUMENTS

| 9,648,641 | B2 | 5/2017 | Sun et al. | |
| 2015/0289292 | A1 | 10/2015 | Sun et al. | |
| 2018/0146486 | A1 | 5/2018 | Aiba et al. | |
| 2018/0205516 | A1 | 7/2018 | Jung et al. | |
| 2020/0236717 | A1* | 7/2020 | Sun | H04L 1/0038 |
| 2020/0345969 | A1* | 11/2020 | Choi | A61M 21/02 |
| 2020/0351947 | A1* | 11/2020 | Lei | H04L 5/0051 |
| 2022/0124813 | A1* | 4/2022 | Cao | H04L 5/0048 |
| 2022/0191937 | A1* | 6/2022 | Lei | H04L 5/0044 |
| 2022/0338222 | A1* | 10/2022 | Kim | H04L 5/00 |

FOREIGN PATENT DOCUMENTS

| CN | 109716825 A | 5/2019 |
| WO | WO 2018/062925 A1 | 4/2018 |
| WO | WO 2018/063731 A1 | 4/2018 |

OTHER PUBLICATIONS

Extended European Search Report received for Application No. EP 19937112.1 dated Jun. 21, 2022 (9 pages).

(Continued)

*Primary Examiner* — Candal Elpenord
(74) *Attorney, Agent, or Firm* — Crowell & Moring LLP (57) ABSTRACT

Wireless communication includes a user equipment that transmits a message to a base station that includes a preamble and a payload corresponding to the preamble in a random access procedure. A parameter is determined based on the preamble, and a de-modulation reference signal ("DMRS") sequence that is used for transmitting the payload is generated based on the parameter.

8 Claims, 4 Drawing Sheets

(56) References Cited

OTHER PUBLICATIONS

Vivo. "Discussion on Channel Structure for 2-step RACH" 3GPP TSG RAN WG1 #97 R1-1906124, May, 13-17, 2019 (14 pages).
ZTE. "Considerations on the Channel Structure of msgA" 3GPP TSG RAN WG1 Meeting #96 R1-1901626, Feb. 25-Mar. 1, 2019 (5 pages).
International Search Report received for Application No. PCT/CN2019/095214 dated Apr. 8, 2020 (7 pages).

* cited by examiner

METHOD AND APPARATUS FOR RANDOM ACCESS PROCEDURE

PRIORITY

This application claims priority as a Continuation of PCT/CN2019/095214, filed on Jul. 9, 2019, entitled "Method and Apparatus for Random Access Procedure", published as WO 2021/003662 A1, the entire disclosure of which is hereby incorporated by reference.

TECHNICAL FIELD

This application is directed generally to wireless communications, and more particularly, to methods, apparatuses and systems for a random access procedure in wireless communications.

BACKGROUND

In both the 4th Generation (4G) and the 5th Generation (5G) new radio (NR) mobile networks, before a user equipment (UE) sends data to a base station (BS), the UE needs to obtain uplink synchronization and downlink synchronization with the BS. The uplink timing synchronization may be achieved by performing a random access procedure.

Figure 1:
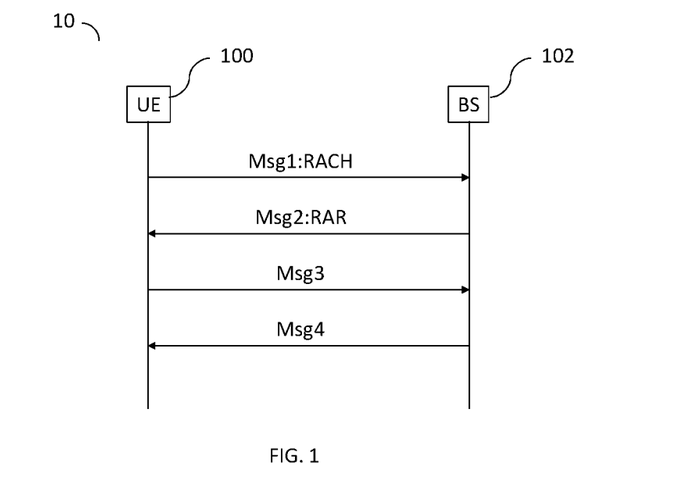
FIG. 1 shows an example of a random access procedure.

An exemplary 4-step random access procedure 10 is shown in FIG. 1. As shown in FIG. 1, a UE 100 transmits a random access channel (RACH) preamble in a message Msg1 to a BS 102. Once the preamble is received successfully by the BS 102, the BS 102 will send a message Msg2 back to the UE 100, in which a medium access control (MAC) random access response (RAR) is included as a response to the preamble. Once the MAC RAR with corresponding random access preamble (RAP) identifier (ID) is received, the UE 100 transmits a message Msg3 to the BS 102 with the grant carried in the MAC RAR. Once the message Msg3 is received, the BS 102 will send a message Msg4 back to the UE 100, in which some kind of contention resolution ID will be included for the purpose of contention resolution.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

SUMMARY OF THE INVENTION

This application relates to methods, systems, and devices for a random access procedure.

The present disclosure relates to a method for a random access procedure, performed by a user equipment and provided according to an embodiment of the present disclosure. The method includes transmitting, to a base station, a message comprising a preamble and a payload corresponding to the preamble in a random access procedure, wherein a parameter is determined based on the preamble, and a de-modulation reference signal, DMRS, sequence used for transmitting the payload is generated based on the parameter.

Various embodiments may preferably implement the following features:

Preferably, a set of DMRS sequences is generated based on parameters which are determined according to preambles transmitted in an occasion transmitting the preamble and the method further comprises selecting one in the set of DMRS sequences as the DMRS sequence of transmitting the corresponding payload according to a pre-defined mapping method between preamble indexes and payload indexes.

\Preferably, the parameter is one of $N_{ID}^{nSCID}$, $n_{SCID}$ or $n_{ID}^{RS}$.

Preferably, the parameter is $N_{ID}^{nSCID}$ or $n_{SCID}$ when a transform precoding is disabled.

Preferably, the parameter is $n_{ID}^{RS}$ when a transform precoding is enabled.

Preferably, the parameter is determined based on at least one of a preamble index or a preamble root index of the preamble.

Preferably, the parameter is determined by:
\parameter=(preamble root index−1)*64.

Preferably, the parameter is determined by:
parameter=(preamble root index−1)*64+[Preamble index/$N_S$]*$N_S$, where $N_S=[N_p/N_d]$, $N_p$ is the number of preambles in an occasion of transmitting the preamble and $N_d$ is the number of DMRS ports in a DMRS sequence.

Preferably, the parameter is determined by:
parameter=mod(preamble index, 2).

Preferably, the parameter is determined by:
parameter=[preamble index/($N_p$/2)], wherein $N_p$ is the number of preambles in an occasion of transmitting the preamble.

Preferably, the parameter is determined by:
parameter=(mod(preamble index, $N_{DMRS\_seq}$)+1)*$2^{11}$, where $N_{DMRS\_seq}$ is the number of DMRS sequences that can be used by the random access procedure.

Preferably, the parameter is determined by:
parameter=([preamble index/($N_p/N_{DMRS\_seq}$)]+1)*$2^{11}$, where $N_p$ is the number of preambles in an occasion transmitting the preamble and $N_{DMRS\_seq}$ is the number of DMRS sequences that can be used by the random access procedure.

The present disclosure relates to a method for a random access procedure, performed by a base station and provided according to an embodiment of the present disclosure. The method includes receiving, from a user equipment, a message comprising a preamble and a payload corresponding to the preamble in a random access procedure; wherein a parameter is determined based on the preamble, and a de-modulation reference signal, DMRS, sequence used for receiving the payload is generated based on the parameter.

Various embodiments may preferably implement the following features:

Preferably, a set of DMRS sequences is generated based on parameters which are determined according to preambles transmitted in an occasion transmitting the preamble and the method further includes receiving the payload by using one of the set of the DMRS sequences according to a pre-defined mapping method between preamble indexes and payload indexes.

Preferably, the parameter is one of $N_{ID}^{nSCID}$, $n_{SCID}$ or $n_{ID}^{RS}$.

Preferably, the parameter is $N_{ID}^{nSCID}$, $n_{SCID}$ when a transform precoding is disabled.

Preferably, the parameter is $n_{ID}^{RS}$ when a transform precoding is enabled.

\Preferably, the parameter is determined based on at least one of a preamble index or a preamble root index of the preamble.

Preferably, the parameter is determined by:
parameter=(preamble root index 1)*64.

Preferably, the parameter is determined by:
parameter=(preamble root index 1)*64+[Preamble index/$N_S$]*$N_S$, where $N_S=[N_p/N_d]$, $N_p$ is the number of preambles in an occasion of transmitting the preamble and $N_d$ is the number of DMRS ports in a DMRS sequence.

Preferably, the parameter is determined by:
parameter=mod(preamble index, 2).

Preferably, the parameter is determined by:
parameter=[preamble index/($N_p$/2)],
wherein $N_p$ is the number of preambles in an occasion of transmitting the preamble.

Preferably, the parameter is determined by:
parameter=(mod(preamble index, $N_{DMRS\_seq}$)+1)*$2^{11}$,
where $N_{DMRS\_seq}$ is the number of DMRS sequences that can be used by the random access procedure.

Preferably, the parameter is determined by:
parameter=([preamble index/($N_p/N_{DMRS\_seq}$)]+1)*$2^{11}$,
where $N_p$ is the number of preambles in an occasion transmitting the preamble and $N_{DMRS\_seq}$ is the number of DMRS sequences that can be used by the random access procedure.

The present disclosure relates to a method for a random access procedure, performed by a user equipment and provided according to an embodiment of the present disclosure. The method includes receiving, from a base station, at least one parameter of generating at least one de-modulation reference signal, DMRS, sequence, and transmitting, to the base station, a message comprising a preamble and a payload corresponding to the preamble in a random access procedure, wherein a DMRS sequence used for transmitting the payload is generated based on a parameter selected from the set of parameters according to a pre-defined mapping method between preamble indexes and payload indexes.

Various embodiments may preferably implement the following features:

Preferably, the parameter is one of $N_{ID}^{N_{SCID}}$, $n_{SCID}$ or $n_{ID}^{RS}$.

Preferably, the parameter is $N_{ID}^{n_{SCID}}$ or $n_{SCID}$ when a transform precoding is disabled.

Preferably, the parameter is $n_{ID}^{RS}$ when a transform precoding is enabled.

Preferably, the at least one parameter is broadcasted by the base station in one of a broadcasting message, a radio resource control message, or a downlink control information message.

The present disclosure relates to a method for a random access procedure, performed by a base station and provided according to an embodiment of the present disclosure. The method includes broadcasting at least one parameter of generating at least one de-modulation reference signal, DMRS, sequence of transmitting at least one payload in a message of a random access procedure, wherein the message further comprises at least one preamble corresponding to the at least one payload.

Various embodiments may preferably implement the following features:

Preferably, the parameter is one of $N_{ID}^{n_{SCID}}$, $n_{SCID}$ or $n_{ID}^{RS}$.

Preferably, the parameter is $N_{ID}^{RS}$ when a transform precoding is disabled.

Preferably, the parameter is $n_{ID}^{RS}$ when a transform precoding is enabled.

Preferably, the method further includes allocating the at least one parameter with different values for different cells.

Preferably, the at least one parameter is broadcasted by the base station in one of a broadcasting message, a radio resource control message, or a downlink control information message.

The present disclosure relates to a network device comprising:
a communication unit configured to transmit, to a base station, a message comprising a preamble and a payload corresponding to the preamble in a random access procedure; and
a processor configured to determine a parameter based on the preamble and to generate a de-modulation reference signal, DMRS, sequence used for transmitting the payload based on the parameter.

Various embodiments may preferably implement the following features:

Preferably, the processor and/or the network device also includes a storage unit having program code stored therein, being configured to, when being executed, cause the processor to perform any of the aforementioned method steps.

The present disclosure relates to a network node comprising:
a communication unit configured to receive, from a user equipment, a message comprising a preamble and a payload corresponding to the preamble in a random access procedure; and
a processor configured to determine a parameter based on the preamble and to generate a de-modulation reference signal, DMRS, sequence used for receiving the payload based on the parameter.

Various embodiments may preferably implement the following features:

Preferably, the processor and/or the network node also includes a storage unit having program code stored therein, being configured to, when being executed, cause the processor to perform any of the aforementioned method steps.

The present disclosure relates to a network device comprising:
a communication unit configured to transmitting, to a network node, a message comprising a preamble and a payload corresponding to the preamble in a random access procedure;
wherein a parameter of generating a de-modulation reference signal, DMRS, sequence for transmitting the payload is broadcasted by the network node.

Various embodiments may preferably implement the following features:

Preferably, the network device further includes a processor being configured to perform any of the aforementioned method steps.

The present disclosure relates to a network node comprising:
a communication unit, configured to broadcast at least one parameter of generating at least one de-modulation reference signal, DMRS, sequence for transmitting at least one payload in a message of a random access procedure,
wherein the message further comprises at least one preamble corresponding to the at least one payload.

Various embodiments may preferably implement the following features:

Preferably, the network node further includes a processor being configured to perform any of the aforementioned method steps.

The above and other aspects and their implementations are described in greater detail in the drawings, the descriptions, and the claims.

Various exemplary embodiments of the present disclosure are described below with reference to the accompanying figures to enable a skilled person to make and use the present disclosure. As would be apparent to those of ordinary skill in the art, after reading the present disclosure, various changes or modifications to the examples described herein can be made without departing from the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 2:
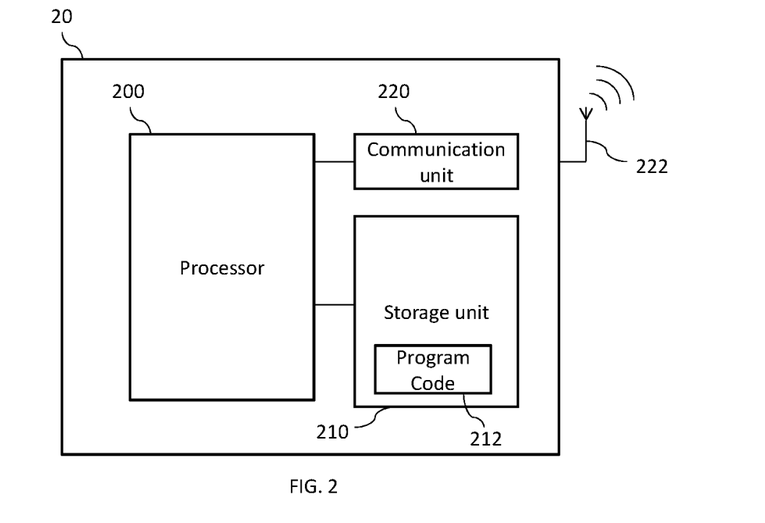
FIG. 2 shows an example of a schematic diagram of a network device according to an embodiment of the present disclosure.

FIG. 2 relates to a schematic diagram of a network device 20 according to an embodiment of the present disclosure. The network device 20 may be a user equipment (UE), a mobile phone, a laptop, a tablet computer, an electronic book or a portable computer system and is not limited herein. The network device 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via an antenna 222 shown in FIG. 2.

In an embodiment, the storage unit 210 and the program code 212 may be omitted and the processor 200 may include a storage unit with stored program code.

Figure 4:
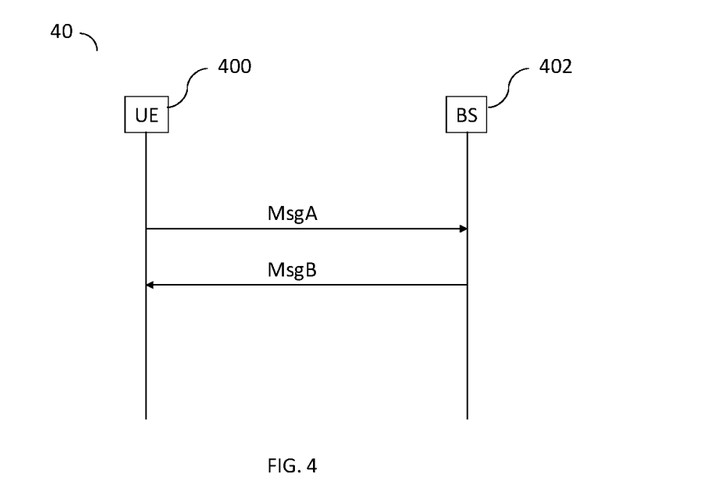
FIG. 4 shows an example of a random access process according to an embodiment of the present disclosure.
Figure 5:
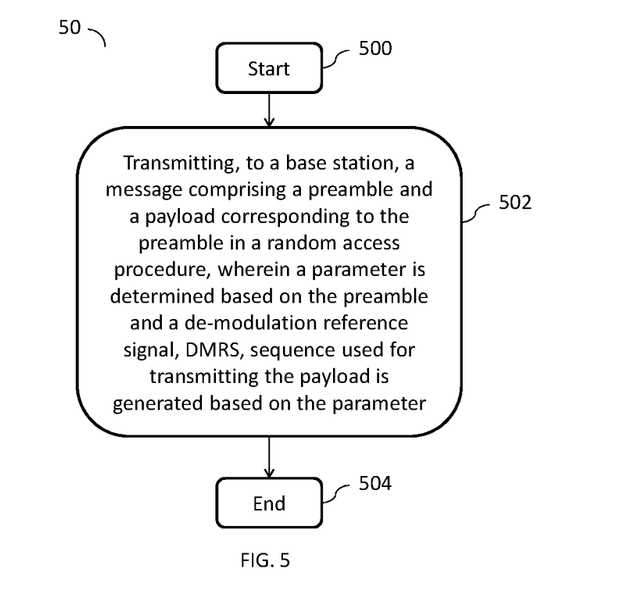
FIG. 5 shows a flow chart of a process according to an embodiment of the present disclosure.
Figure 7:
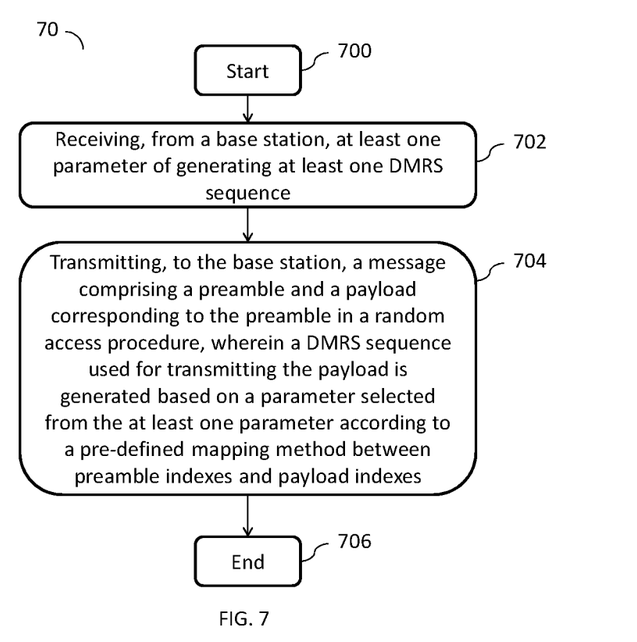
FIG. 7 shows a flow chart of a process according to an embodiment of the present disclosure.

The processor 200 may implement any one of the steps in embodiments shown in FIGS. 4, 5 and 7 on the network device 20.

The communication unit 220 may be a transceiver. The communication unit 220 may as an alternative or in addition be combining a transmitting unit and a receiving unit configured to transmit and to receive, respectively, signals to and from a network node (e.g. a BS).

Figure 3:
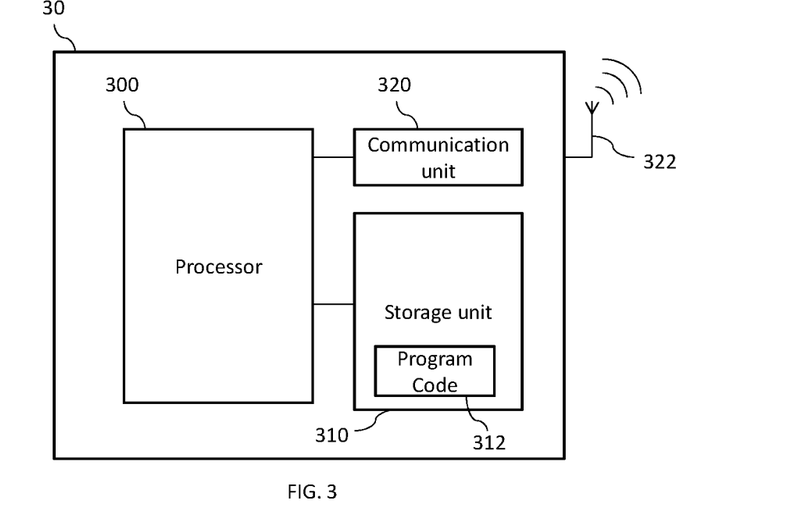
FIG. 3 shows an example of a schematic diagram of a network node according to an embodiment of the present disclosure.

FIG. 3 relates to a schematic diagram of a network node 30 according to an embodiment of the present disclosure. The network node 30 may be a base station (BS), a network entity, a Mobility Management Entity (MME), Serving Gateway (S-GW), Packet Data Network (PDN) Gateway (P-GW), or Radio Network Controller (RNC), and is not limited herein. The network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via an antenna 322 shown in FIG. 3.

In an embodiment, the storage unit 310 and the program code 312 may be omitted the processor 300 may include a storage unit with stored program code.

Figure 6:
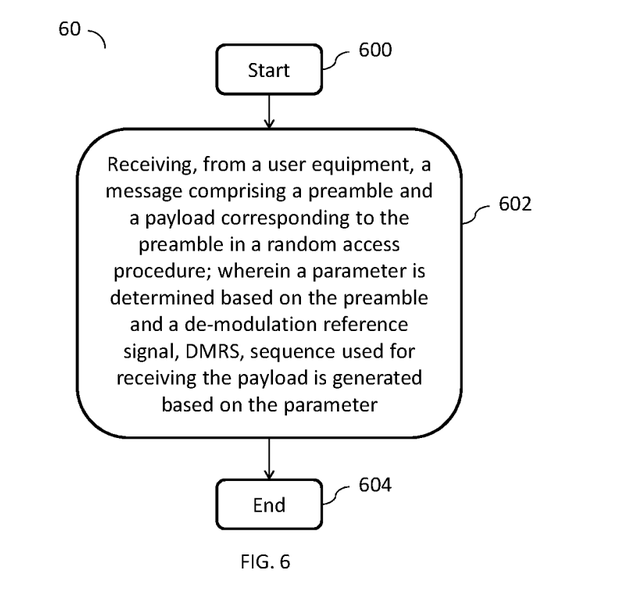
FIG. 6 shows a flow chart of a process according to an embodiment of the present disclosure.
Figure 8:
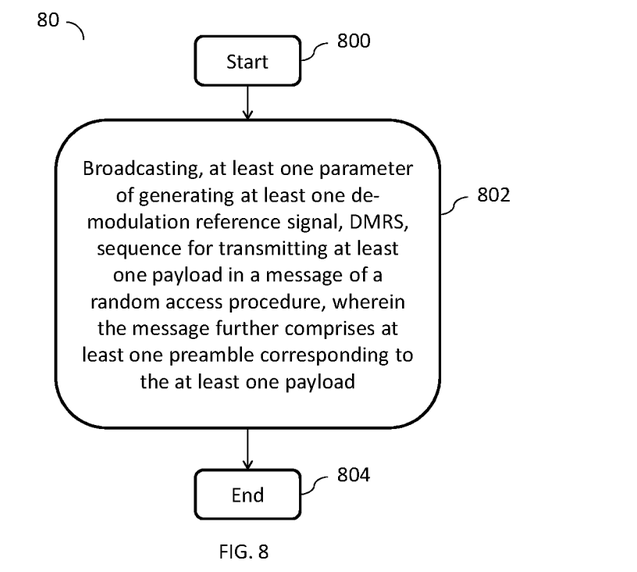
FIG. 8 shows a flow chart of a process according to an embodiment of the present disclosure.

The processor 300 may implement any steps described in embodiments shown in FIGS. 4, 6 and 8 on the network node 30.

The communication unit 320 may be a transceiver. The communication unit 320 may as an alternative or in addition be combining a transmitting unit and a receiving unit configured to transmit and to receive, respectively, signals to and from a network device (e.g. a UE).

FIG. 4 relates to a schematic diagram of a process 40 according to an embodiment of the present disclosure. The process 40 is used for a random access procedure performed by a UE 400 (e.g. the network device 20) for an access to a BS 402 (e.g. the network node 30). As shown in FIG. 4, the UE 400 transmits a message MsgA to the BS 402 for the access to the BS 402, and the message MsgA includes a preamble carried on a physical random access channel (PRACH) and a corresponded payload carried on a physical uplink shared channel (PUSCH). In response to the message MsgA, the BS 402 returns a message MsgB to the UE 400. In an embodiment, the message MsgA includes as least some of the messages Msg1 and Msg3 shown in FIG. 1 and the message MsgB includes at least some of the messages Msg2 and Msg4 shown in FIG. 1. According to FIG. 4, the UE 400 is able to access to the BS 402 via the two-step process 40.

In order to make the two-step process 40 shown in FIG. 4 more feasible and more beneficial, the preamble (e.g. PRACH) and the payload (e.g. PUSCH) should have a pre-configured mapping relationship. For example, a demodulation reference signal (DMRS) sequence for transmitting the payload may be generated based on the preamble. In an embodiment, a parameter of generating the DMRS sequence for transmitting the payload may be determined based on the preamble. In an embodiment, the parameter for generating the DMRS sequence may be one of $N_{ID}^{nSCID}$, $n_{SCID}$ or $n_{ID}^{RS}$ defined in 3GPP TS 38.211 version 15.2.0 Release 15, chapter 6.4.1.

If transform precoding is disabled, the parameter determined by the preamble may be $N_{ID}^{nSCID}$ or $n_{SCID}$ and the DMRS sequence for transmitting the payload may be initialized with:

$$c_{init}=(2^{17}(N_{symb}^{slot}+l+1)(2N_{ID}^{nSCID}+1)+ 2N_{ID}^{nSCID}+n_{SCID})$$

where $N_{ID}^{nSCID} \in \{0, 1, \ldots, 65535\}$ and is set as a cell identification (ID) when a radio resource control (RRC) state of the UE is IDLE or INACTIVE and $n_{SCID} \in \{0, 1\}$ and is set to 0 when the RRC state of the UE is IDLE or INACTIVE.

If the transform precoding is enabled, the parameter may be re and the DMRS sequence r(n) shall be generated according to:

$$zr(n)=r_{u,v}^{(\alpha,\delta)}(n), n=0, 1, \ldots, M_{sc}^{PUSCH}/2^{\delta}-1$$

where the sequence group u is related to the parameter $n_{ID}^{RS}$ and the parameter $n_{ID}^{RS}$ is set as the cell ID of the UE when the RRC state is IDLE or INACTIVE.

Via establishing the relationship between the preamble and the DMRS sequence of transmitting the payload, the amount of payloads transmitted in the PUSCH (e.g. the number of PUSCH resource units (PRUs)) may increase.

Considering the resource efficiency and a problem of DMRS collision, the present disclosure provides various embodiments of determining the parameter of generating the DMRS sequence based on at least one of a preamble root index or a preamble index of the preamble in the followings.

In an example of the transform precoding is disabled, the parameter is $N_{ID}^{nSCID}$ and is determined by:

$$N_{ID}^{nSCID}=f(\text{pramble\_root\_index,pramble\_index})$$

In this example, the exact DMRS sequence can be determined by the function f ( ) based on the preamble root index and/or the preamble index of the preamble and the UE selects an exact DMRS port according to a pre-defined mapping method between the preamble indexes and DMRS port indexes.

In an example of the transform precoding is disabled, the parameter is $N_{ID}^{nSCID}$ and is determined by:

$$N_{ID}^{nSCID}=f(\text{pramble\_root\_index,pramble\_index})$$

In this example, a set of DMRS sequences can be determined by the function f ( ) based on the preamble root indexes and/or preamble indexes of the preambles transmitted in an occasion (e.g. a PRACH occasion) and constitutes a PRU pool with DMRS ports. Next, the UE selects an exact DMRS sequence and an exact DMRS port used for transmitting the payload according to a pre-defined mapping method between the preamble indexes and payload indexes (e.g. PRU indexes).

In an example of the transform precoding is disabled, the parameter is $n_{srm}$ and is determined by:

$$N_{SCID}=g(\text{pramble\_root\_index,pramble\_index})$$

In this example, the exact DMRS sequence can be determined by the function go based on the preamble root index and/or the preamble index of the preamble and the UE selects an exact DMRS port according to a pre-defined mapping method between the preamble indexes and DMRS port indexes.

In an example of the transform precoding is disabled, the parameter is $TI_{SCH}$) and is determined by:

$$N_{SCID}=g(\text{pramble\_root\_index,pramble\_index})$$

In this example, a set of DMRS sequences can be determined by the function go based on the preamble root indexes and/or preamble indexes of the preambles sent in an occasion (e.g. a PRACH occasion) and constitutes a PRU pool with DMRS ports. Next, the UE selects an exact DMRS sequence and an exact DMRS port used for transmitting the payload according to a pre-defined mapping method between the preamble indexes and payload indexes (e.g. PRU indexes).

In an example of the transform precoding is enabled, the parameter is $n_{ID}^{RS}$, and is determined by:

$$n_{ID}^{RS}=f(\text{pramble\_root\_index,pramble\_index})$$

In this example, the exact DMRS sequence can be determined by the function f ( ) based on the preamble root index and/or the preamble index of the preamble and the UE selects an exact DMRS port according to a pre-defined mapping method between preamble indexes and DMRS port indexes.

In an example of the transform precoding is enabled, the parameter is nfl, and is determined by:

$$n_{ID}^{RS}=f(\text{pramble\_root\_index,pramble\_index})$$

In this example, a set of DMRS sequences can be determined by the function f ( ) based on the preamble root indexes and/or the preamble indexes of the preambles send in an occasion (e.g. a PRACH occasion) and constitutes a PRU pool with DMRS ports. Next, the UE selects an exact DMRS sequence and an exact DMRS port used for transmitting the payload according to a pre-defined mapping method between the preamble indexes and payload indexes (e.g. PRU indexes).

The functions f ( ) and g ( ) based on the preamble root index and/or the preamble index are exemplified in the followings.

In an embodiment of the number of DMRS sequences can be used for transmitting the payload are equal to the number of the preamble root indexes, the function f ( ) of determining the parameter $N_{ID}^{nSCID}$ or $n_{ID}^{RS}$ can be expressed as:

$$f(\text{pramble\_root\_index,pramble\_index})=(\text{pramble\_root\_index}-1)*64$$

Since each cell has unique preamble root index, there is no inter-cell DMRS collision. Note that, there is also not intra-cell DMRS collusion if the number of preambles of each preamble root is equal to or less than the number of DMRS ports since the preamble roots may be configured to different DMRS ports. Even if the number of preambles of each preamble root is larger than the number of DMRS port, the possibility of DMRS collision would be still lower by adopting the function f ( ) of this embodiment to determine the parameter of generating the DMRS sequence for transmitting the payload because the possibility of preambles corresponding to the same DMRS sequence use the same DMRS port is lower.

In an embodiment of supporting 1 to 1 mapping, the number of preambles mapped to one DMRS sequence should be less than or equal to the number of DMRS ports. To achieve the 1 to 1 mapping, the number $N_p$ of preambles transmitted in an occasion (e.g. a RACH occasion) and the minimum number $N_S$, of the DMRS sequences are introduced to the function of determining the parameter $N_{ID}^{nSCID}$ or $n_{ID}^{RS}$:

$$f(\text{pramble\_root\_index,pramble\_index}) = (\text{pramble\_root\_index,pramble\_index}-1)*64+[\text{preamble\_index}/N_S]*N_S$$

where [x] represents a floor function of outputting the greatest number which is less than or equal to the input variable x, $N_S=\lceil N_p/N_d \rceil$, $\lceil x \rceil$ is a ceil function of outputting the least number which is greater than or equal to the input variable x and $N_d$ is the number of DMRS ports for one DMRS sequence. In this embodiment, both the inter-cell and intra-cell DMRS collision are eliminated because of 1 to 1 mapping.

In an embodiment of only 2 DMRS sequences are supported, the function of determining the parameter $n_{SCID}$ can be expressed as:

g(pramble_index)=mod(preamble_index, 2)

where mod(h,k) is a function of returning the remainder after division of h by k and can also be shown as "h mod k". Under such a condition, the parameter $n_{SCID} \in \{0, 1\}$. In addition, the parameter $N_{ID}^{nSCID}$ may be set as the cell ID of the UE. That is, the range of parameters $n_{SCID}$ and $N_{ID}^{nSCID}$ remain the same with the existing standard. Since the cell ID is included in the parameter $N_{ID}^{nSCID}$, cell DMRS collision is eliminated.

In an embodiment of only 2 DMRS sequences are supported, the function of determining the parameter $n_{SCID}$ can be expressed as:

g(pramble_index)=[preamble_index/($N_p$/2)]

where $N_p$ is the number of preambles transmitted in the occasion (e.g. RACH occasion) of transmitting the preamble. In addition, the parameter $N_{ID}^{nSCID}$ may be set as the cell ID of the UE. In this embodiment, the range of the parameters $n_{SCID}$ and $N_{ID}^{nSCID}$ remain the same with the existing standard. Because the cell ID is included in the parameter $N_{ID}^{nSCID}$, the inter-cell DMRS collision is eliminated.

In an embodiment of more than 2 DMRS sequences are supported, the function of determining the parameter $n_{SCID}$ can be expressed as:

g(pramble_index)=(mod(preamble_index, $N_{DMRS\_seq}$)+1)*2$^{11}$ where $N_{DMRS\_seq}$ is the number of DMRS sequences can be used for transmitting the payload. In this embodiment, the range of parameter $n_{SCID}$ is $\{1,2, \ldots, N_{DMRS\_seq}\}*2^{11}$. Because multiplying $2^{11}$, the parameter $n_{SCID}$ is prevented from colliding with the cell ID of the UE. Furthermore, the inter-cell DMRS collision is eliminated because the cell ID is included in the parameter $N_{ID}^{nSCID}$.

In an embodiment of more than 2 DMRS sequences are supported, the function of determining the parameter $n_{SCID}$ can be expressed as:

g(pramble_index)=([preamble_index/($N_p$/$N_{DMRS\_seq}$))]1)*2$^{11}$ where $N_p$ is the number of preambles in the occasion (e.g. RACH occasion) of transmitting the preamble and $N_{DMRS\_seq}$ is the number of DMRS sequences can be used for transmitting the payload. In this embodiment, the range of parameter $n_{SCID}$ is $\{1, 2, \ldots, N_{DMRS\_seq}\}*2^{11}$. Because multiplying $2^{11}$, the parameter $n_{SCID}$ is prevented from colliding with the cell ID of the UE. Furthermore, the inter-cell DMRS collision is eliminated because the preamble are divided into preamble sets according to a ratio between $N_p$ and $N_{DMRS\_seq}$ and each preamble set is mapped to a unique DMRS sequence.

In an example, the parameter for determining the DMRS sequence for transmitting the payload in the message MsgA of the 2-step random access procedure may be broadcasted by the BS. The BS may broadcast at least one parameter used for generating at least one DMRS sequence to the UE, where the at least one parameters may be one of $N_{ID}^{nSCID}$, $n_{SCID}$ or $n_{ID}^{RS}$. In an embodiment, the at least one parameter is broadcasted in a broadcasting message, such as system information. In an embodiment, the at least one parameter is broadcasted in a radio resource control (RRC) message. In an embodiment, the at least one parameter is broadcasted in a common downlink control information (DCI) message. In a random access procedure, the UE transmits a message comprising a preamble and a payload to the base station, wherein the UE selects one of the at least one parameter based on a pre-defined mapping method between preamble indexes and payload indexes and uses the selected parameter to generate a DMRS sequence used for transmitting the payload. For example, the pre-defined mapping method may determine the selected parameter based on the preamble index of the preamble and the payload index of the payload. That is, the DMRS sequence used for transmitting the payload is generated based on the at least one parameter broadcasted by the BS.

Note that, the base station may allocate the at least one parameter with different values for different cells, so as to avoid the inter-cell DMRS collision.

Please refer to FIG. 5, which relates to a flow chart of a process 50 according to an example of the present disclosure. The process 50 may be performed by a UE (e.g. the network device 20) and comprises the following steps:

Step 500: Start.

Step 502: Transmitting, to a base station, a message comprising a preamble and a payload corresponding to the preamble in a random access procedure, wherein a parameter is determined based on the preamble and a de-modulation reference signal, DMRS, sequence used for transmitting the payload is generated based on the parameter.

Step 504: End.

In the process 50, the UE transmits a message (e.g. MsgA shown in FIG. 4) comprising a preamble and a payload corresponding to the preamble in a random access procedure. Note that, a parameter is determined based on the preamble and a DMRS sequence of transmitting the payload is generated based on the parameter. In an embodiment, a set of DMRS sequences is generated based on preambles which are transmitted in an occasion transmitting the preambles and the UE selects one in the set of DMRS sequences as the DMRS sequence of transmitting the corresponding payload according to a pre-defined mapping method between preamble indexes and payload indexes.

In an embodiment, the parameter determined based on the preamble is one of $N_{ID}^{nSCID}$, $n_{SCID}$ or $n_{ID}^{RS}$. For example, the parameter is one of $N_{ID}^{nSCID}$ or $n_{SCID}$ when a transform precoding is disabled and is $n_{ID}^{RS}$ when a transform precoding is enabled.

In an embodiment, the parameter is determined based on at least one of the preamble root index or the preamble index of the preamble. For example, the parameter may be determined by:

parameter=(preamble root index 1)*64

In another example, the parameter may be determined by:

parameter=(preamble root index 1)*64+[Preamble index/$N_S$]*$N_S$ where $N_S=\lceil N_p/N_d \rceil$, $N_p$ is the number of preambles in the occasion of transmitting the preamble and $N_d$ is the number of DMRS ports in a DMRS sequence.

In an example, the parameter may be determined by:

parameter=mod(preamble index, 2).

In an example, the parameter may be determined by:

parameter=[preamble index/($N_p$/2)], wherein $N_p$ is the number of preambles in the occasion of transmitting the preamble.

In an example, the parameter may be determined by:

parameter=(mod(preamble index, $N_{DMRS\_seq}$)+1)*$2^{11}$, where $N_{DMRS\_seq}$ is the number of DMRS sequences can be used by the random access procedure.

In an example, the parameter may be determined by:

parameter=([preamble index/($N_p$/$N_{DMRS\_seq}$)]+1)*$2^{11}$, where $N_p$ is the number of preambles in the occasion transmitting the preamble and $N_{DMRS\_seq}$ is the number of DMRS sequences can be used by the random access procedure.

Please refer to FIG. 6, which relates to a flow chart of a process 60 according to an example of the present disclosure. The process 60 may be performed by a BS (e.g. the network device 30) and comprises the following steps:

Step 600: Start.

Step 602: receiving, from a user equipment, a message comprising a preamble and a payload corresponding to the preamble in a random access procedure, wherein a parameter is determined based on the preamble and a de-modulation reference signal, DMRS, sequence used for receiving the payload is generated based on the parameter.

Step 604: End.

In the process 60, the BS receives a message (e.g. MsgA shown in FIG. 4) comprising a preamble and a corresponding payload in a random access procedure from a UE. Based on the preamble, the BS is able to determine a parameter of generating a DMRS sequence for receiving (e.g. de-coding) the payload. In an example, the BS determines a plurality of parameters based on a plurality of preambles transmitted in an occasion of the preamble, generates a set of DMRS sequences by using the set of parameters and receives the payload by using one of the DMRS sequences according to a pre-defined mapping method between preamble indexes and payload indexes.

In an embodiment, the parameter determined based on the preamble is one of $N_{ID}^{nSCID}$, $n_{SCID}$ or $n_{ID}^{RS}$. For example, the parameter is $N_{ID}^{nSCID}$ or $n_{SCID}$ when a transform precoding is disabled and is $n_{ID}^{RS}$ when a transform precoding is enabled.

In an embodiment, the parameter is determined based on at least one of a preamble root index or a preamble index of the preamble. For example, the parameter may be determined by:

parameter=(preamble root index−1)*64

In another example, the parameter may be determined by:

parameter=(preamble root index 1)*64+[Preamble index/$N_S$]*$N_S$ where $N_S$=[$N_p$/$N_d$], $N_p$ is the number of preambles in the occasion of transmitting the preamble and $N_d$ is the number of DMRS ports in a DMRS sequence.

In an example, the parameter may be determined by:

parameter=mod(preamble index, 2).

In an example, the parameter may be determined by:

parameter=[preamble index/($N_p$/2)], wherein $N_p$ is the number of preambles in the occasion of transmitting the preamble.

In an example, the parameter may be determined by:

parameter=(mod(preamble index, $N_{DMRS\_seq}$)+1)*$2^{11}$, where $N_{DMRS\_seq}$ is the number of DMRS sequences can be used by the random access procedure.

In an example, the parameter may be determined by:

parameter=[preamble index/($N_p$/$N_{DMRS\_seq}$)]+1)*$2^{11}$, where $N_p$ is the number of preambles in the occasion transmitting the preamble and $N_{DMRS\_seq}$ is the number of DMRS sequences can be used by the random access procedure.

Please refer to FIG. 7, which relates to a flowchart of a process 70. The process 70 may be performed by a UE and comprises the following steps:

Step 700: Start.

Step 702: Receiving, from a base station, at least one parameter of generating at least one DMRS sequence.

Step 704: Transmitting, to the base station, a message comprising a preamble and a payload corresponding to the preamble in a random access procedure, wherein a DMRS sequence used for transmitting the payload is generated based on a parameter selected from the at least one parameters according to a pre-defined mapping method between preamble indexes and payload indexes.

Step 706: End.

According to the process 70, the UE receives at least one parameter of generating at least one DMRS sequence from a BS. For example, the at least one parameter may be broadcasted by the BS in a broadcasting message, a RRC message, or a DCI message, and is not limited herein. In addition, the at least one parameter may be one of $N_{ID}^{nSCID}$, $n_{SCID}$ or $n_{ID}^{RS}$. For example, the at least one parameter is $N_{ID}^{nSCID}$ or $n_{SCID}$ when the transform precoding is disabled and is $n_{ID}^{RS}$ when the transform precoding is enabled. In a random access procedure, the UE transmits a message comprising a preamble and a payload to the BS and a DMRS sequence used for transmitting the payload is generated based on a parameter selected from the received at least one parameter according to a pre-defined mapping method between preamble indexes and payload indexes.

Please refer to FIG. 8, which relates to a flowchart of a process 80. The process 80 may be performed by a BS and comprises the following steps:

Step 800: Start.

Step 802: Broadcasting, at least one parameter of generating at least one de-modulation reference signal, DMRS, sequence for transmitting at least one payload in a message of a random access procedure, wherein the message further comprises at least one preamble corresponding to the at least one payload.

Step 804: End.

According to the process 80, the BS broadcasts at least one parameter of generating at least one DMRS sequence for transmitting at least one payload in a message of a random access procedure. Note that, the message further comprises at least one preamble corresponding to the at least one payload (e.g. MsgA shown in FIG. 4). The at least one parameter may be one of $N_{ID}^{nSCID}$, $n_{SCID}$ or $n_{ID}^{RS}$. For example, the at least one parameter is $N_{ID}^{nSCID}$ or $n_{SCID}$ when the transform precoding is disabled and is nfl, when the transform precoding is enabled.

In an embodiment, the BS allocates the at least one parameter with different values for difference cells of the BS, so as to avoid inter-cell DMRS collision.

In an embodiment, the at least one parameter is broadcasted in one of a broadcasting message, a radio resource control message, or a downlink control information message.

To sum up, the parameter for generating DMRS sequence of transmitting the payload in a message (e.g. MsgA shown in FIG. 4) of the random access procedure can be broadcasted by the base station or determined based on the preamble corresponding to the payload. As a result, the problem of DMRS collision can be eased or even eliminated without performance degradation.

We claim:

1. A wireless communication method for use in a user equipment, comprising:
   generating a de-modulation reference signal (DMRS) sequence based on a parameter which is determined based on at least one of a preamble index or a preamble root index of a preamble; and
   transmitting, to the base station, a message comprising the preamble and a payload corresponding to the preamble in a random access procedure,
   wherein the DMRS sequence is used for transmitting the payload, and wherein the parameter is one of $N_{ID}^{nSCID}$, $n_{SCID}$ or $n_{ID}^{RS}$, wherein the parameter is determined by:
   parameter=mod(preamble index,2), or
   parameter=$\lfloor$preamble index/$(N_p/2)\rfloor$, where $N_p$ is the number of preambles in an occasion of transmitting the preamble, or
   parameter=(mod(preamble index, $N_{DMRS\_seq}$)+1)*$2^{11}$, where $N_{DMRS\_seq}$ is the number of DMRS sequences that can be used by the random access procedure, or
   parameter=($\lfloor$preamble index/$(N_p/N_{DMRS\_seq})\rfloor$+1)*$2^{11}$, where $N_p$ is the number of preambles in an occasion transmitting the preamble and $N_{DMRS\_seq}$ is the number of DMRS sequences that can be used by the random access procedure, or
   parameter=(preamble root index −1)*64, or
   parameter=(preamble root index −1)*64+$\lfloor$Preamble index/$N_S\rfloor$*$N_S$, where $N_S=\lceil N_p/N_d\rceil$, $N_p$ is the number of preambles in an occasion of transmitting the preamble and $N_d$ is the number of DMRS ports in a DMRS sequence.

2. The method of claim 1, wherein the parameter is $N_{ID}^{nSCID}$ $n_{SCID}$ when a transform precoding is disabled.

3. The method of claim 1, wherein the parameter is $n_{ID}^{RS}$ when a transform precoding is enabled.

4. A wireless communication method for use in a base station, comprising:
   determining at least one de-modulation reference signal (DMRS) sequence based on a parameter which is determined based on at least one of a preamble index or a preamble root index of a preamble, and
   receiving, from the user equipment, a message comprising the preamble and a payload corresponding to the preamble in a random access procedure,
   wherein the DMRS sequence is used for receiving the payload, and
   wherein the parameter is one of $N_{ID}^{nSCID}$, $n_{SCID}$ or $n_{ID}^{RS}$, wherein the parameter is determined by:
   parameter=mod(preamble index, 2), or
   parameter=$\lfloor$preamble index/$(N_p/2)\rfloor$, where $N_p$ is the number of preambles in an occasion of transmitting the preamble, or
   parameter=(mod(preamble index, $N_{DMRS\_seq}$)+1)*$2^{11}$, where $N_{DMRS\_seq}$ is the number of DMRS sequences that can be used by the random access procedure, or
   parameter=($\lfloor$preamble index/$(N_p/N_{DMRS\_seq})\rfloor$+1)*$2^{11}$, where $N_p$ is the number of preambles in an occasion transmitting the preamble and $N_{DMRS\_seq}$ is the number of DMRS sequences that can be used by the random access procedure, or
   parameter=(preamble root index −1)*64, or
   parameter=(preamble root index −1)*64+$\lfloor$Preamble index/$N_S\rfloor$*$N_S$, where $N_S=\lceil N_p/N_d\rceil$, $N_p$ is the number of preambles in an occasion of transmitting the preamble and $N_d$ is the number of DMRS ports in a DMRS sequence.

5. The method of claim 4, wherein the parameter is $N_{ID}^{nSCID}n_{SCID}$ when a transform precoding is disabled.

6. The method of claim 4, wherein the parameter is $n_{ID}^{RS}$ when a transform precoding is enabled.

7. A network device comprising a processor being configured to:
   generate a de-modulation reference signal (DMRS) sequence based on a parameter which is determined based on at least one of a preamble index or a preamble root index of a preamble, and
   transmit, to a network node, a message comprising the preamble and a payload corresponding to the preamble in a random access procedure;
   wherein the DMRS sequence is used for transmitting the payload, and
   wherein the parameter is one of $N_{ID}^{nSCID}$, $n_{SCID}$ or $n_{ID}^{RS}$, wherein the parameter is determined by:
   parameter=mod(preamble index, 2), or
   parameter=$\lfloor$preamble index/$(N_p/2)\rfloor$, where $N_p$ is the number of preambles in an occasion of transmitting the preamble, or
   parameter=(mod(preamble index, $N_{DMRS\_seq}$)+1)*$2^{11}$, where $N_{DMRS\_seq}$ is the number of DMRS sequences that can be used by the random access procedure, or
   parameter=($\lfloor$preamble index/$(N_p/N_{DMRS\_seq})\rfloor$+*$2^{11}$, where $N_p$ is the number of preambles in an occasion transmitting the preamble and $N_{DMRS\_seq}$ is the number of DMRS sequences that can be used by the random access procedure, or
   parameter=(preamble root index −1)*64, or
   parameter=(preamble root index −1)*64+$\lfloor$Preamble index/$N_S\rfloor$*$N_S$, where $N_S=\lceil N_p/N_d\rceil$, $N_p$ is the number of preambles in an occasion of transmitting the preamble and $N_d$ is the number of DMRS ports in a DMRS sequence.

8. A network node comprising a processor being configured to:
   determine at least one de-modulation reference signal (DMRS) sequence based on a parameter which is determined based on at least one of a preamble index or a preamble root index of a preamble, and
   receive, from the user equipment, a message comprising the preamble and a payload corresponding to the preamble in a random access procedure,
   wherein the DMRS sequence is used for receiving the payload, and
   wherein the parameter is one of $N_{ID}^{nSCID}$, $n_{SCID}$ or $n_{ID}^{RS}$, wherein the parameter is determined by:
   parameter=mod(preamble index, 2), or
   parameter=$\lfloor$preamble index/$(N_p/2)\rfloor$, where $N_p$ is the number of preambles in an occasion of transmitting the preamble, or
   parameter=(mod(preamble index, $N_{DMRS\_seq}$)+1)*$2^{11}$, where $N_{DMRS\_seq}$ is the number of DMRS sequences that can be used by the random access procedure, or
   parameter=($\lfloor$preamble index/$(N_p/N_{DMRS\_seq})\rfloor$+*$2^{11}$, where $N_p$ is the number of preambles in an occasion transmitting the preamble and $N_{DMRS\_seq}$ is the number of DMRS sequences that can be used by the random access procedure, or
   parameter=(preamble root index −1)*64, or
   parameter=(preamble root index −1)*64+$\lfloor$Preamble index/$N_S\rfloor$*$N_S$, where $N_S=\lceil N_p/N_d\rceil$, $N_p$ is the number of preambles in an occasion of transmitting the preamble and $N_d$ is the number of DMRS ports in a DMRS sequence.

\* \* \* \* \*